Inventors:
Martin T. A. Salter
Arthur H. Jones
By Kemon, Palmer & Estabrook
Attorneys Inventors:
Martin T. A. Salter
Arthur H. Jones
By Kemon, Palmer & Estabrook
Attorneys Dec. 15, 1970 M. T. A. SALTER ET AL 3,548,325

DIGITAL TRANSMISSION OF TELEVISION

Filed Aug. 1, 1968 5 Sheets-Sheet 3

Inventors:
Martin T. A. Salter
Arthur H. Jones
By Kemon, Palmer & Estabrook
Attorneys Inventors:
Martin T. A. Salter
Archer H. Jones
By Kemon, Palmer & Estabrook
Attorneys Inventors:
Martin T. A. Salter
Arthur H. Jones
By Kemon, Palmer & Estabrook
Attorneys 3,548,325

DIGITAL TRANSMISSION OF TELEVISION

Martin Thomas Ardley Salter, Croydon, Surrey, and Arthur H. Jones, Southwater, Sussex, England, assignors to The Marconi Company Limited and Standard Telephone & Cables Limited, both of London, England Filed Aug. 1, 1968, Ser. No. 749,419
Claims priority, application Great Britain, Aug. 3, 1967, 35,777/67
Int. Cl. H03k 5/01
U.S. Cl. 328—178 3 Claims

ABSTRACT OF THE DISCLOSURE

In the processing of a video signal changes in the amplitude of the signal between upper and lower limits and occurring in a time interval greater than a predetermined value following other changes in amplitude level exceeding a predetermined value are detected and the abruptness of the detected changes is reduced.

The present invention relates to the digital transmission of television signals.

The normal television video signal is a varying voltage or current, the instantaneous amplitude of which is an analogue representation of the brightness of the picture element being portrayed.

The total excursion of a video signal can, alternatively, be divided into a fixed number of discrete levels; such a signal is said to be "quantized." The instantaneous amplitude of the signal may then be described as a number which identifies the level nearest to the original analogue value. This numbering of the levels usually employs binary digits, which may be easily represented by groups of pulses, and a video signal in this form can take advantage of modern digital techniques for processing and transmission of data.

In practical systems, the number of levels that can be represented is limited by such restriction as cost and the availability of equipment able to handle a large number of pulses. Hence digitised pictures may frequently be portrayed by a number of brightness levels insufficient to portray correctly subtle variations of light and shade; objects such as clouds or faces are portrayed by sharply defined areas of uniform brightness similar in appearance to a relief map in which the areas between each adjacent pair of contour lines are identified by a particular shade of grey.

The visibility of these spurious brightness boundaries or "contours" may be reduced by increasing the number of available levels but this is not always possible.

The present invention has for its principal object to provide apparatus whereby the visibility of objectionable contours is reduced.

According to the present invention there is provided apparatus for processing a video signal comprising means for detecting changes in amplitude of the signal having a magnitude between predetermined upper and lower limits and occurring at a time interval greater than a predetermined value following other changes in amplitude level exceeding a predetermined value and means for reducing the abruptness of the detected changes in amplitude.

Figure 1:
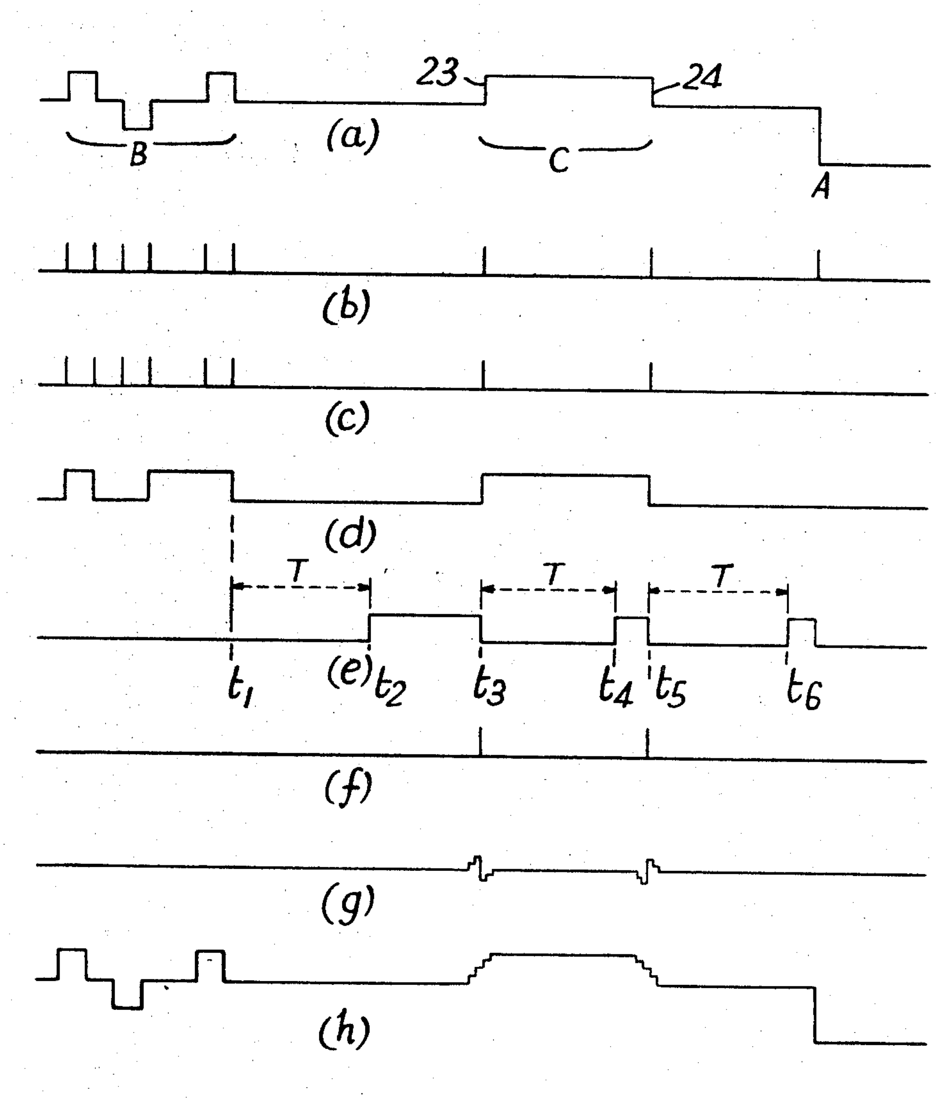
Figure 2:
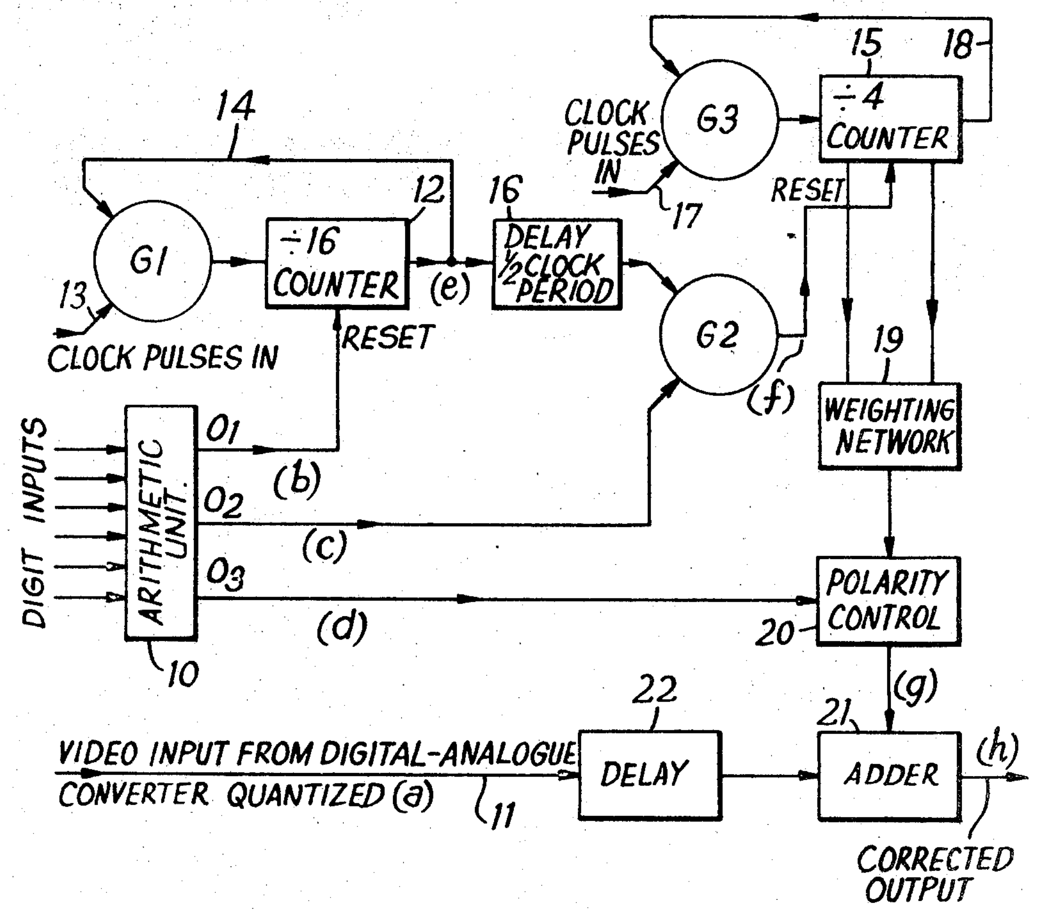
Figure 3:
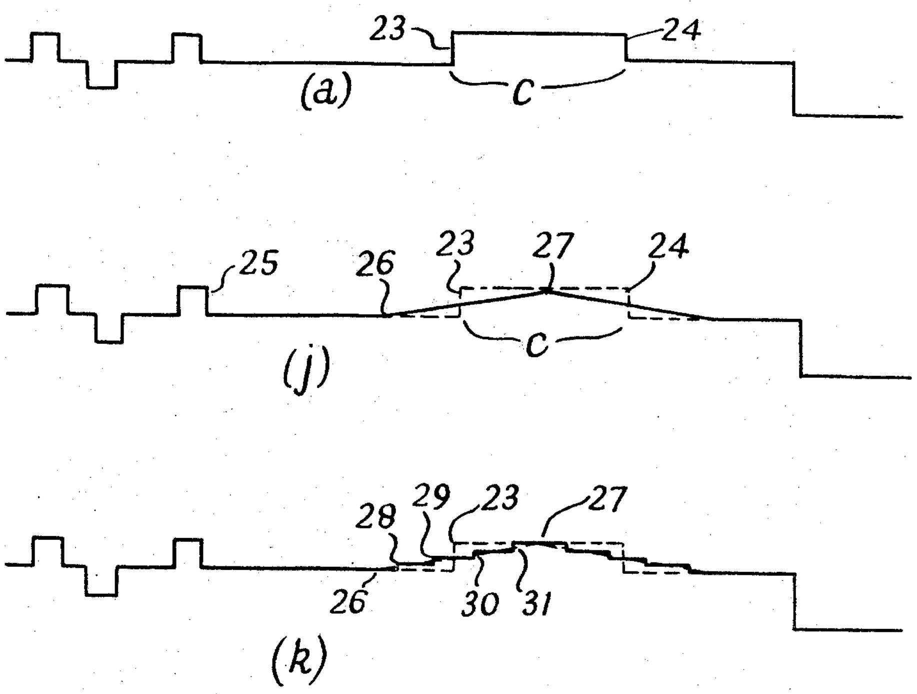
Figure 4:
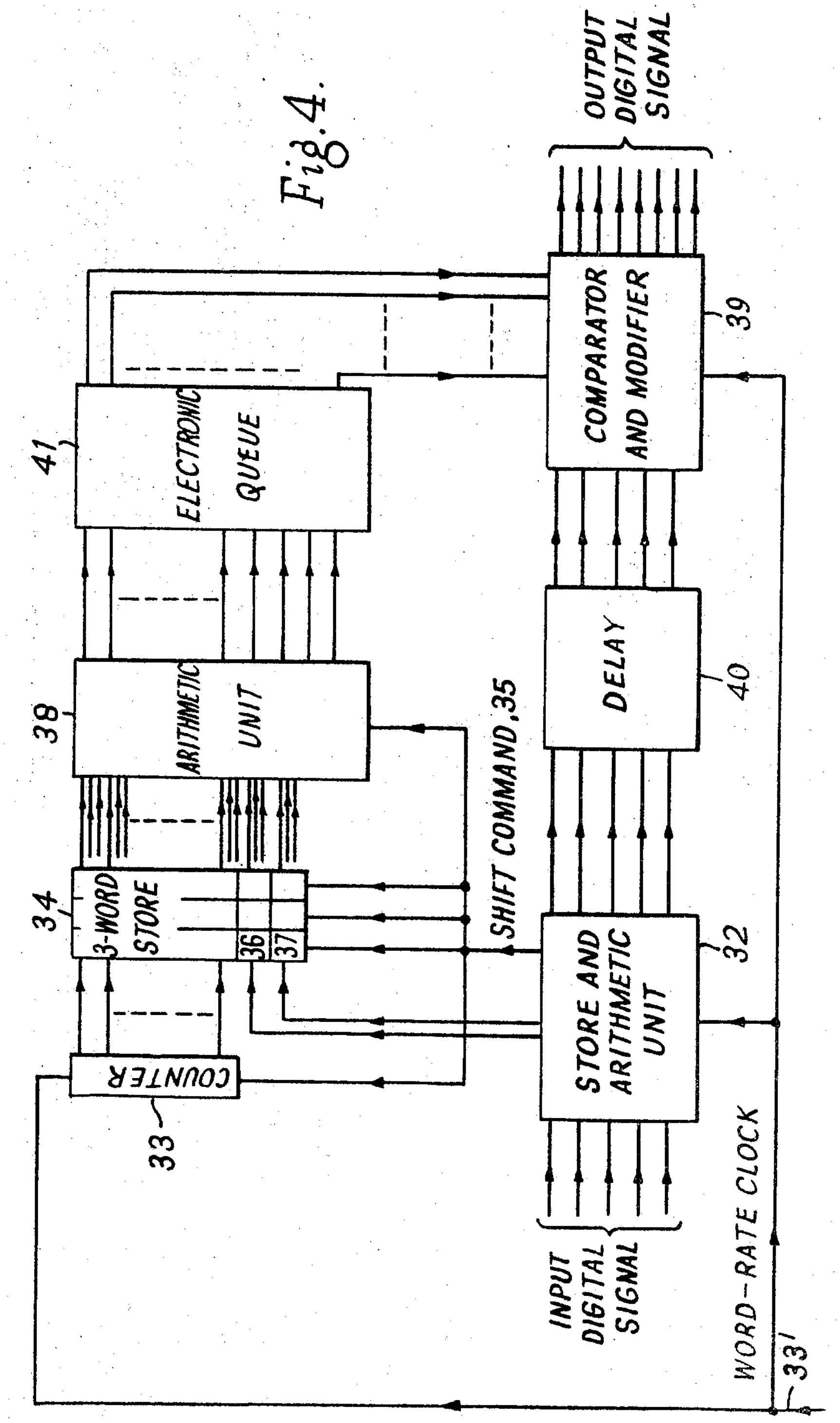
Figure 5:
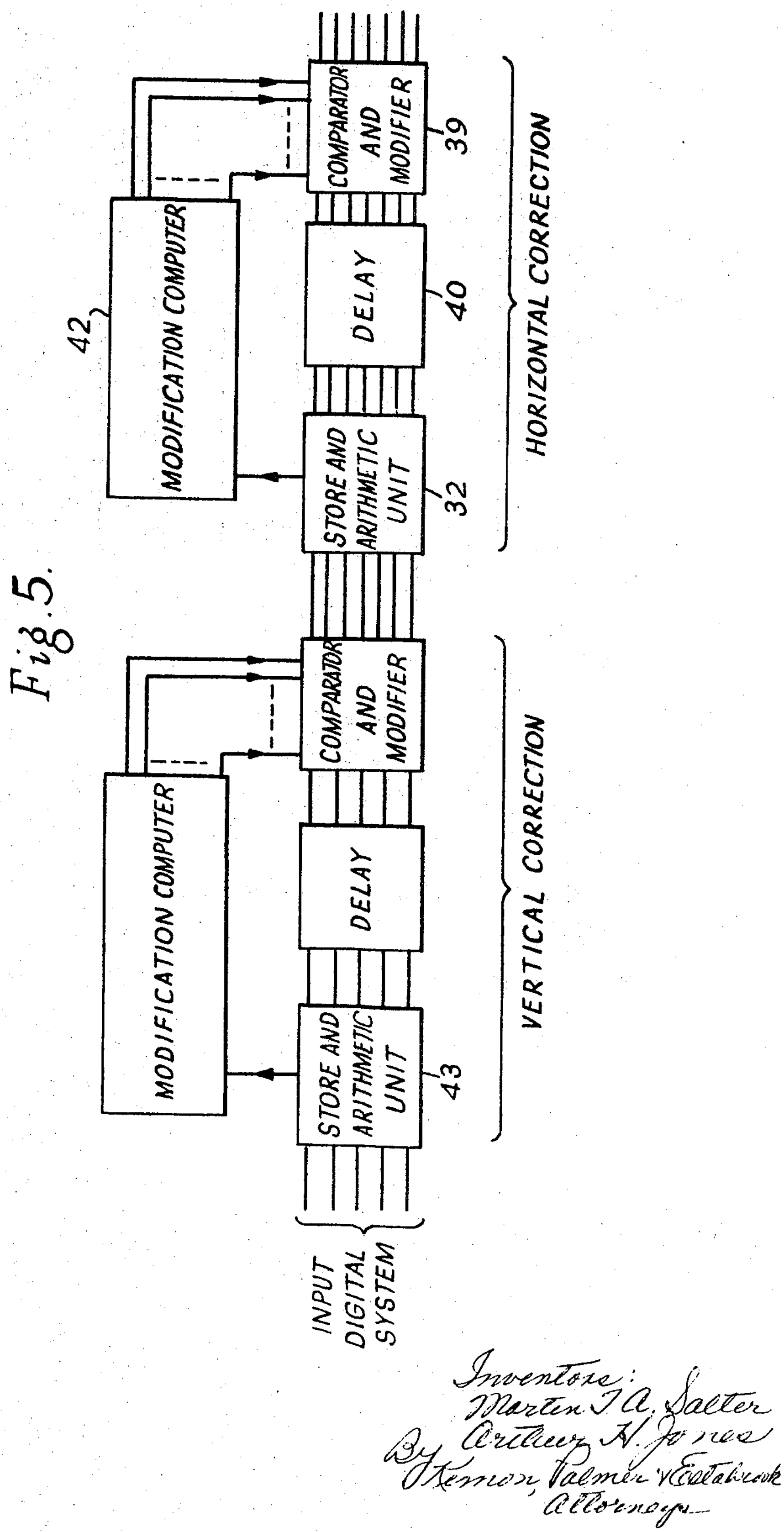

The invention will be further described with reference to the accompanying drawings in which:

FIG. 1 contains waveforms (*a*) to (*h*) used in explaining the invention,

FIG. 2 is a block circuit diagram of one embodiment of the invention, given by way of example, FIG. 3 is a waveform diagram used in explaining a modified form of the invention, FIG. 4 is a block circuit diagram of the modified form of the invention, and FIG. 5 is a block circuit diagram of yet another modified form of the invention.

Points in FIG. 2 at which the waveforms (*a*) to (*h*) of FIG. 1 occur are indicated by corresponding letters.

Referring to FIG. 1, there is shown at (*a*) a quantised video waveform, the total number of possible quantum levels being assumed, for simplicity, to be only four. The amplitude of the waveform at B, as shown in curve (*a*) varies between four and two quanta, that at C being four quanta and that at A varying from three to one quantum.

In typical pictures contours will be most obvious in areas containing little detailed information, e.g., sky, walls, etc. These features of the original scene are usually gently shaded, and the transitions from one quantum level to the next are widely spaced. If a transition is greater in amplitude than one quantum as at A or is close to other transitions such as those at B then the transistions are probably intended picture content and should not be altered. The contour at the left-hand end of the region C on the other hand, occurs at a substantial interval after the right-hand transition of B.

It will be assumed in this description, given by way of example, that account has to be taken only of transitions in amplitude that lie between zero and one quantum in magnitude and that are separated from a preceding amplitude transition of not less than one quantum by more than an arbitrarily determined time interval T (see (*d*) and (*e*) FIG. 1) which may be 1.6 microseconds. This is true of the transitions at the beginning and end of the interval C, where it is desired to reduce the abruptness of the transitions. Although the transition at A occurs at an interval after the end of C greater than T, it is to be disregarded from the point of view of the present invention because it has an amplitude greater than one quantum.

Referring now to the circuit diagram of FIG. 2, taken in conjunction with the waveforms of FIG. 1, a digital input representative of the waveform of FIG. 1(*a*) is applied to an arithmetic unit 10 and also to a digital-to-analogue converter (not shown) which delivers the quantised analogue waveform (*a*) on the lead 11. The unit 10 is arranged to perform simple mathematical processes on the digital input and gives three outputs at $O_1$, $O_2$ and $O_3$. These have the forms shown at (*b*), (*c*) and (*d*) respectively in FIG. 1.

The output $O_1$ (FIG. 1(*b*)) consists of a pulse occurring whenever there is any change in the numerical value of the waveform (*a*). The output $O_2$ (FIG. 1(*c*)) consists of a pulse occurring whenever a change (indicated by a pulse in FIG. 1(*b*)) has a magnitude not greater than one quantum (representing one least-significant unit). The output $O_3$ (FIG. 1(*d*)) has a zero value when the change in waveform (*a*) is negative (i.e. a reduction) and a positive value when the change in waveform (*a*) is positive (i.e. an increase). This waveform of FIG. 1(*d*) therefore indicates the polarity of the changes in the waveform (*a*).

The waveform (*b*) from $O_1$ is fed to a divide-by-sixteen counter 12 arranged to count clock pulses having a recurrence period of 0.1 microsecond applied at 13 whenever a gate $G_1$ is open. The clock pulses are generated by means not shown and are synchronous with the groups of digits. Such a train of pulses is available in a normal digital-to-analogue converter. Initially the counter 12 is at zero and the gate $G_1$ is open. When sixteen clock pulses have been counted (that is after 1.6 microseconds) the output from the counter fed back through a lead 14 closes the gate $G_1$ and counting stops. However, if before the count of sixteen has been reached a pulse (*b*) from $O_1$ arrives, the counter is re-set and counting recommences. In this way the counter 12 produces a positive-going output (*e*) whenever sixteen clock pulses have been counted without the occurrence of a transition represented by a pulse (*b*).

When there is a positive-going output (*e*) from the counter 12, this opens a gate $G_2$. The output (*c*) from $O_2$ can then pass through this gate $G_2$ to a divide-by-four counter 15 and re-set this counter. A short delay (for example of half a clock pulse period) is introduced by a device 16 into the waveform (*e*) fed to the gate $G_2$ in order to ensure that a pulse of waveform (*c*) can pass the gate $G_2$ before the gate $G_2$ is closed by the waveform (*e*).

Considering the waveform (*e*), and its operation starting at a time $t_1$, it will be noted that since after a time T (equal to 1.6 microseconds) following the time $t_1$ no transition has occurred, a positive-going edge is generated at the time $t_2$. At the time $t_3$ a transition occurs (waveform (*b*)) and this re-sets the counter 12 producing a negative-going edge in the waveform (*e*). After a time T, at the time $t_4$, the counter 12 has reached its count of sixteen before the arrival of a further transition, and a positive-going edge is produced. At $t_5$ a further transition occurs, thus re-setting the counter 12 and producing a negative-going edge. At the time $t_6$ a full count of sixteen has taken place without the arrival of a transition, and a positive-going edge is thus produced; and so on.

Returning now to the divide-by-four counter 15, this is re-set by a pulse (*f*) which occurs when a pulse of waveform (*c*) from $O_2$ is allowed by the delayed waveform (*e*) to pass through the gate $G_2$. The counter 15 then counts four clock pulses supplied at 17 through a gate $G_3$ which has been opened by the change of state of a wire 18 produced by the output from the gate $G_2$, when this gate is re-set. After counting four clock pulses the counter 15 feeds a pulse through a lead 18 to the gate $G_3$ to close this gate.

The outputs of all the stages of the counter 15 are fed to a weighting network 19 which converts them to a four-level "ramp" signal, shown in the waveform (*g*) whose peak-to-peak amplitude equals one quantum level. The waveform (*g*) includes the one-quantum step needed to cancel the original transition. This step can be derived by means of suitable connections in the counter 15. The signal from the network 19 is fed to a polarity control 20 which determines the polarity of the signal (*g*) in dependence on the waveform (*d*) from $O_3$. The output from 20 is fed to an adder 21 in which it is added to the signal (*a*) fed on the lead 11. A delay network 22 is included in order that the centre of the double ramps in the waveform (*g*) may synchronise with the transitions in C of the waveform (*a*). The corrected signal (*h*) appears at the output of the adder 21.

It will be seen from FIG. 1, and particularly from curves (*a*) and (*h*), that the contour-edge 23 is smoothed because it occurs more than 1.6 microseconds after the previous transition and has an amplitude of one quantum. The contour edge 24 is smoothed because it occurs more than 1.6 microseconds after the edge 23 and also has an amplitude of one quantum. Other edges of the waveform (*a*) are not changed.

As an alternative embodiment of the above invention, the correction signal may be applied before the digital-to-analogue conversion process. In this case the two outputs of the divide-by-four counter 15 are applied together with the waveform (*d*) to a unit which generates a train of digital words representing the waveform (*g*). This signal is then added to a delayed version of the incoming digital signal to give a digital signal representing the waveform (*h*). This signal may then by converted to analogue form, the digital-to-analogue converter benig required in this alternative embodiment to handle two extra digits per word as compared with that referred to in the description of FIG. 2.

In the embodiments of the invention so far described, the correction waveform (*g*) applied to the video waveform extends for an arbitrarily determined fixed interval on each side of each transition to be modified. A more complicated correction apparatus can be provided to enable the correction waveform to extend for an interval which depends on the time interval between the transition to be modified and the adjacent transitions. The mode of action of an arrangement for modifying the digital picture signal in this way will be described with reference to FIG. 3.

FIG. 3 shows at (*a*) the waveform (*a*) in FIG. 1; there are two transitions, 23 and 24, which are to be modified. It is again assumed, by way of example, that it is required to replace each of these transitions by four smaller transitions appropriately spaced.

At (*j*) is a waveform to which the modified signal will be made to approximate. Dealing firstly with transition 23, there is measured the interval between 23 and the adjacent transitions 24 and 25. The smallest of these (which in this case happens to be the interval C) is chosen. Points 26 and 27, spaced at intervals $\pm C/2$ from 23 are then marked on the waveform (*j*) and an oblique line is drawn to connect them. The transition 24 is dealt with similarly.

The input signal (*a*) is then modified so as to produce a signal corresponding to (*k*), the latter being an approximation to (*j*). At the point 28, which occurs an interval $3C/8$ before 23, the waveform (*k*) rises to one quarter the height of the original transition. At 29, situated $C/8$ before 23, the waveform rises to half the height of the original transition. At 30, situated $C/8$ after 23, the waveform rises to ¾ the height of the original transition. At 31, situated $3C/8$ after 23, the waveform rises to meet the original waveform (*a*). Similar considerations apply to the transition 24.

FIG. 4 shows the block diagram of a device suitable for carrying out the operation described with reference to FIG. 3. This contains a unit 32 in which transitions are identified and classified, units 33, 34, 38 and 41 in which the information required for contour correction is calculated and assembled, and a unit 39 in which the correction is applied. Input digital words describing the video waveform (*a*) enter a store and arithmetic unit 32. The store may take the form of a set of shift registers, through which the digital words pass in orderly sequence; the delay from input to output corresponds to twice the minimum interval T required between a transition and the adjacent ones in order that the transition shall be regarded as an unwanted contour.

As each word reaches a location at the centre of the store 32, it is examined, together with all of the other words in the store, by the arithmetic unit. The function of this unit is to decide whether the word at the centre of the store marks a transition, and also whether the transition requires correction.

When the first word corresponding to the picture information within a television line arrived at the centre of the store 32, a word-rate clock pulse generator (not shown but connected at 33') is connected to a counter 33. The number present in this counter then subsequently defines the position along a television line at which the information carried by the word at the centre of store 32 will appear. Now whenever the word at the centre of the store 32 is found to correspond to a transition, whether or not the transition corresponds to an unwanted contour, the number present within counter 33 is transferred into a 3-word store 34 by a shift command at 35. This store contains two further sets of digit locations 36 and 37 which carry information additionally generated in arithmetic unit 32. The location 36 is used to indicate whether the transition is or is not one needing correction. The location 37 indicates whether the transition is up-going as at 23, or down-going as at 24. The shift command at 35 moves the numbers through the store 34 and also primes a second arithmetic unit 38.

The function of the unit 38 is to decide, by measuring the interval between a transition and the two adjacent transitions, the interval during which contour correction is to be applied. The unit 38 has access to all three of the numbers stored in 34. It looks firstly at the centre number. If this denotes a transition that needs no correction, the unit 38 takes no further action. If on the other hand the centre number denotes a transition to be corrected, the unit 38 calculates, using the three numbers stored in 34, five numbers which determine the times at which changes in the correction signal applied to the vision signal are to be made. If, for instance, the number at the centre of store 34 corresponds to the transition 23, the unit 38 will generate numbers corresponding to the transitions 28, 29, 23, 30 and 31. To each of these numbers are attached four extra digits. Two of these denote the magnitude of the correction to be applied; the third, generated from information stored in the location 37, decides whether the correction signal is to be added to or subtracted from the incoming video signal. The fourth extra digit is the same from word to word, and is termed a "marker digit." The video signal modification is carried out in a unit 39, the signal to be corrected having emerged from the unit 32, and having been delayed in a unit 40 so that the necessary correction may be calculated in time.

Now if the interval between the transition to be corrected and the adjacent transitions is sufficiently great, the video signal after correction will be changing so gradually that any further increase in the intervals such as 28 to 31 over which correction is applied will be unnoticed. The unit 38 may therefore be so modified that when incoming transitions are very widely separated, the shift command at 35 is overridden and a correction signal of the maximum necessary duration is generated. The use of this artifice enables the digital storage requirement to be reduced.

When information relating to the correction of a particular transition emerges from the unit 38, that part of the video signal that describes the transition will be within the delay unit 40, but its precise position within the delay unit 40 will be intermediate. It is therefore necessary to provide some form of elastic storage between the units 38 and 39 so that information relating to the correction of several transitions may be stored as necessary and yet delivered to the unit 39 in time to be effective. The form of storage indicated for this purpose in FIG. 4 may be termed an "electronic queue" 41. This may be an assemblage of shift registers similar to that forming the three-word store 34. Its total capacity depends on the shortest interval between transitions for which an unwanted contour is judged to be present, and the longest interval during which contour correction need be applied.

The electronic queue 41 thus contains a number of word locations through which the numbers generated in the arithmetic unit 38 pass in numerical order together with their associated four extra digits. Each word location within the electronic queue has associated with it a circuit which looks for the presence of a marker digit. If a marker digit is not present, a shift pulse is sent to the preceding word location. In this way information fed in an irregular sequence into the input of the unit 41 is formed up in an orderly queue at the output of this unit.

The comparator and modifier 39 contains a counter, driven by a word-rate clock, similar to the counter 33.

The counter within the unit 39 is started when the word corresponding to the picture information at the beginning of a television line enters the unit 39. The number within this counter is compared with a number taken from the output of the unit 41. When the two numbers come into coincidence the associated modification to the vision signal is commenced. Then another number is taken from the unit 41, and the process is continued.

Arrangements should be provided for resetting each of the digital circuits at the end of each television line.

In the embodiments of the invention so far described, contour correction signals are generated by examining digital words corresponding to successive picture elements within a television line; correction of the picture is thereby effected in the horizontal direction only. An extension of the same basic arrangement can be arranged to give correction in both the horizontal and the vertical directions (and thus in all other directions since any contour may be resolved into horizontal and vertical components). A simplified schematic of an arrangement for doing this is shown in FIG. 5.

The right-hand half of this figure is a horizontal corrector of the form already described with reference to FIG. 4. The modification computer 42 embraces the units 33, 34, 38 and 41 of FIG. 4.

The left-hand half of FIG. 5 deals with correction in the vertical direction. The store and arithmetic unit 43 is similar to the unit 32 except that it is capable of storing video signals relating to several lines in the picture, and the arithmetic unit examines digital words spaced by intervals of one line. Thus the counters and storage units used for vertical correction must be able to handle several television lines worth of information instead of several picture elements.

Vertical and horizontal correction may be performed in either order, but since the digital words carrying picture information contain two extra digits occurring after the first of these processes has been carried out it is better that vertical correction should come first.

We claim:

1. Apparatus for processing a video signal comprising means for detecting changes in amplitude of the signal having a magnitude between predetermined upper and lower limits and occurring in a time interval greater than a predetermined value following other changes in amplitude level exceeding a predetermined value and means for reducing the abruptness of the detected changes in amplitude.

2. Apparatus according to claim 1, wherein said means for reducing the abruptness of amplitude change are arranged to modify the signal waveform over a fixed and predetermined time.

3. Apparatus according to claim 1, wherein said means for reducing the abruptness of amplitude change are arranged to modify the signal waveform over an interval dependent upon the time between the amplitude change to be modified and adjacent amplitude changes before or after or both before and after such interval.

References Cited

UNITED STATES PATENTS 3,435,350 3/1969 Powers -------------- 328—14

JOHN S. HEYMAN, Primary Examiner

J. ZAZWORSKY, Assistant Examiner

U.S. Cl. X.R.

178—6, 68; 307—263; 325—38; 328—135, 164, 187